United States Patent [19]

Bridges

[11] Patent Number: 4,556,076

[45] Date of Patent: Dec. 3, 1985

[54] FIRE RESISTANT VALVE

[75] Inventor: Charles D. Bridges, Houston, Tex.

[73] Assignee: Gray Tool Comany, Houston, Tex.

[21] Appl. No.: 486,146

[22] Filed: Apr. 18, 1983

[51] Int. Cl.[4] .................... F16K 17/38; F16K 41/14
[52] U.S. Cl. ................................ 137/72; 251/214; 251/330
[58] Field of Search ............... 137/72, 75; 251/330, 251/214, 327

[56] References Cited

U.S. PATENT DOCUMENTS

| | | | |
|---|---|---|---|
| 364,842 | 6/1887 | Morrin | 251/330 X |
| 663,736 | 12/1900 | Delaney | 251/330 X |
| 1,183,790 | 5/1916 | Allen | 251/330 X |
| 4,240,455 | 12/1980 | McGee | . |
| 4,289,157 | 9/1981 | McGee | . |

*Primary Examiner*—Arnold Rosenthal
*Attorney, Agent, or Firm*—Troxell K. Snyder

[57] ABSTRACT

A normally non-rising stem valve having a valve stem (30) journaled between bearings (38, 40) is equipped with an energized drive spring (56) for positively engaging backseat seal surfaces (64, 66) upon melting of a fusible ring (52). The spring (56) is compressed axially against the retainer (46) by the cooperative action of the compression nut (58) and the tubular spacer (50), thereby normally avoiding undesirable axial thrust on the bearings (38, 40).

4 Claims, 2 Drawing Figures

FIRE RESISTANT VALVE

FIELD OF THE INVENTION

The present invention relates to an improvement in a normally non-rising stem valve for use in oil and gas producing industries having a metal-to-metal backseat seal and, more particularly, to a normally non-rising stem valve having a metal-to-metal backseat seal engageable when the valve is subjected to an abnormally high temperature, such as during a fire.

BACKGROUND OF THE INVENTION

The use of non-rising stem gate valves to control the flow of high pressure fluid or gas is well known in the energy producing industry. It is also known to use a metal-to-metal backseat seal between the valve stem and the valve bonnet to seal the inner valve chamber from the exterior environment in order to allow repacking of the valve stem or replacement of the valve stem journal bearings. See for example U.S. Pat. No. 4,149,558 "Selective Backseat Valve", By McGee et al.

In the oil and gas producing industries, this valve has been further modified so as to automatically backseat under high temperature conditions, such as a fire, during which the resilient packing seal between the valve stem and the valve bonnet may be damaged and allow leakage. This modification, disclosed in U.S. Pat. No. 4,289,157 "Valve With Heat-Responsive Bearing Assembly Providing Backseat Arrangement", by McGee, includes a fusible washer-like annulus placed in the valve stem journal bearing assembly. Upon heating of the valve to an abnormally high temperature, the fusible annulus melts and runs out of a passageway provided to the exterior of the valve. The valve stem is now free to rise a limited extent due to the internal valve chamber pressure, thereby engaging the annular metal-to-metal sealing surfaces provided on the valve bonnet and the valve stem.

While this design is entirely satisfactory, it does not meet new standards for fire resistant valves for use in petroleum or natural gas applications. In particular, these standards require that the metal-to-metal backseat be established and maintained even under conditions of zero gauge pressure within the valve chamber. It will be appreciated by those skilled in the art that the apparatus of U.S. Pat. No. 4,289,157 requires a finite pressure differential between the interior chamber and the valve exterior in order to drive the valve stem upwards and effect the backseat seal.

What is needed is a simple, effective means for engaging the metal-to-metal backseat seal in a non-rising stem valve under the combined conditions of abnormally high valve temperature and zero internal valve chamber gauge pressure.

SUMMARY OF THE INVENTION

The valve disclosed herein is of the non-rising stem gate type which, according to the present invention, has a metal-to-metal backseat stem seal actuable under abnormally high temperatures and low or no gauge pressure present within the valve chamber. This is accomplished by the use of a pair of facing annular metal sealing surfaces disposed respectively on the valve bonnet and the valve stem. An annular ring of fusible material normally holds these surfaces in an axially spaced apart relationship.

Should the valve be exposed to abnormally high temperatures, such as during a fire, the fusible ring melts, freeing the stem to rise a short distance and thus engaging the metal-to-metal backseat seal. This rise, according to the present invention, is accomplished by means of an annular spring disposed about the valve stem and acting upon the valve stem and bonnet to move the stem, forcing the melted fusible ring to flow from its normal location. The valve according to the present invention thus positively engages the metal-to-metal backseat seal upon the melting of the fusible material at a preselected temperature above the normal valve operating temperature.

It is also a feature of the valve according to the present invention that the melted fusible ring be positively driven from its normal position, regardless of the chamber pressure of the valve, by the action of the annular spring. A vent is provided to facilitate the flow of molten material out of the valve.

It is still another feature of the valve according to the present invention that the annular spring does not normally exert any axially thrust on the valve stem, being rather held in a compressed, stored energy, state until released by the melting of the fusible ring and only then acting upon the valve stem to engage the backseat seal.

Still another feature of the valve according to the present invention is that the backseat seal is engageable without regard to the position of the material flow regulating member, such as the gate, plug, or ball, and without altering this position at the time of engaging the backseat seal.

DESCRIPTION OF THE PREFERRED EMBODIMENT

Figure 1:
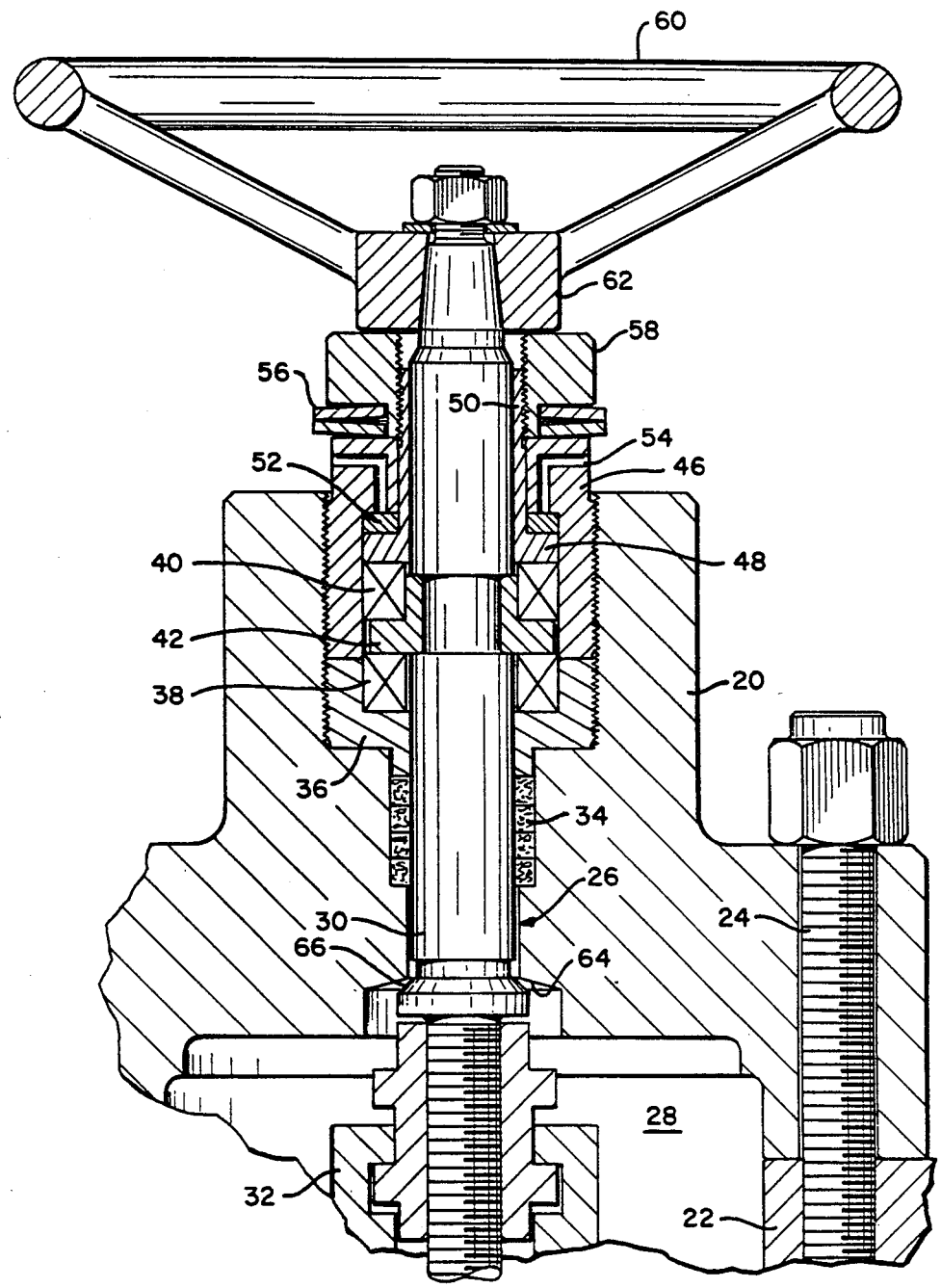
FIG. 1 shows a cross section of the valve in normal operating condition.

Referring now to the drawing figures, and especially to FIG. 1, a cross sectional representation of the bonnet portion of the valve according to the present invention may be seen. The remaining portion of the valve is similar to those valves present in the prior art and disclosed in U.S. Pat. No. 4,289,157 issued to McGee.

As shown in the drawing figure, valve bonnet 20 is shown secured to the valve body 22 by a series of holddown bolts 24 arranged axially about the valve bonnet 20. The valve bonnet 20 includes a central passage 26 which communicates with the chamber 28 in the valve body. An elongated valve stem 30 is shown disposed within the central passage 26 for the purpose of moving the gate member 32 for regulating the flow of material through the valve. The gate member 32 and valve body 22 are virtually identical to similar structures well known in this art, and therefore not herein reproduced in full. It is to be understood that the gate member may equivalently be a ball, a plug, or any other flow regulating member actuable by rotation of the valve stem.

Leakage through the central passage 26 past the stem 30 is normally controlled by means of a packing 34 disposed between the stem 30 and the walls of the central passage 26 as shown in the drawing figure. This packing is retained in place and sealingly engaged with the passage and the stem by the packing gland nut 36 which exerts an axial force upon the packing 34. The packing material, although suitable for normal service use, is usually unable to resist the high temperature conditions which may be present during a fire or other similar occurrence.

A split collar 42 is shown secured to the valve stem 30 between journal bearings 38, 40. The journal bearings 38, 40 serve to permit rotation of the valve stem 30. The journal bearings 38, 40 and the valve stem 30 are normally restrained from outward axially movement by the action of the tubular spacer 50 which contacts the upper roller bearing 40 through a flanged end 48. The flange section 48 in turn contacts a fusible ring 52 which is physically interposed between the flange 48 and the retainer 46. The retainer 46 is shown as a gland threadedly engaging the valve bonnet 20 on the interior of the central passage 26 and extending radially inward into the central passage 26.

The fusible ring 52 is made of any of a number of materials known in the art such as lead, bismuth, or other materials with a relatively low temperature melting point. By proper selection of the material for fabrication of the fusible ring 52, it is possible to provide a fusible ring which will retain its structural integrity under normal valve operating conditions, but will melt during periods of abnormally high temperature. Preferably the melting temperature of the fusible ring 52 is selected at a temperature above normal valve operating conditions and below the temperature at which the packing material 34 will fail.

Upon melting of the fusible member 52, the melted material flows out of the central passage 26 through the vent 54 shown in the retainer 46. This vent 54 may alternatively be provided in the valve bonnet 20 or by other means, depending upon the exact arrangement of the valve members.

Continuing in the axially outward direction along the valve stem 30, an annular drive spring 56 is shown compressed, or energized, between the retainer 46 and a compression nut 58. The compression nut 58 is threadedly engaged with the tubular spacer 50 and allows compression of the spring 56 without normally exerting any force upon the upper or lower journal bearings 40, 38. The annular spring 56 is shown in FIG. 1 as a pair of thick spring washers having a generally frusto-conical cross section in the axial plane. The pair of spring washers are preferably arranged as shown in the drawings, with the larger radius surfaces touching. It is to be understood that a single spring washer, a coil spring, a hydraulic spring, or any other equivalent structure for exerting an axially outward force on the compression nut 58 may be substituted for the depicted spring 56 without departing from the scope of the invention. A handwheel 60 shown attached at the end of the stem 30 includes a drive flange 62 extending outward from the valve stem 30 in close axial proximity to the compression nut 58.

Upon exposure to abnormally high temperatures, such as during a fire, the fusible ring 52 will lose structural integrity and be forced to flow out of the central passage 26 through the vent 54 by the action of the annular spring 56 in providing axially outward thrust against the compression nut 58 and the tubular retainer 46.

The axially outward motion of the compression nut 58 causes the drive flange 62, and hence the valve stem 30 to also rise outward. This outward motion engages the backseat seal which comprises an annular sealing surface 64, disposed in the bonnet 20 about the inner end of the central passage 26 where the central passage 26 intersects with the valve chamber 28, and an annular sealing shoulder 66 disposed around the stem 30. These two sealing surfaces 64, 66, which are normally held in a spaced apart relationship by the action of the fusible ring 52 in preventing axially outward motion of the valve stem 30, are engaged and provide a complete metal-to-metal seal against leakage from the valve chamber 28 through the central passage 26 to the exterior of the valve.

Figure 2:
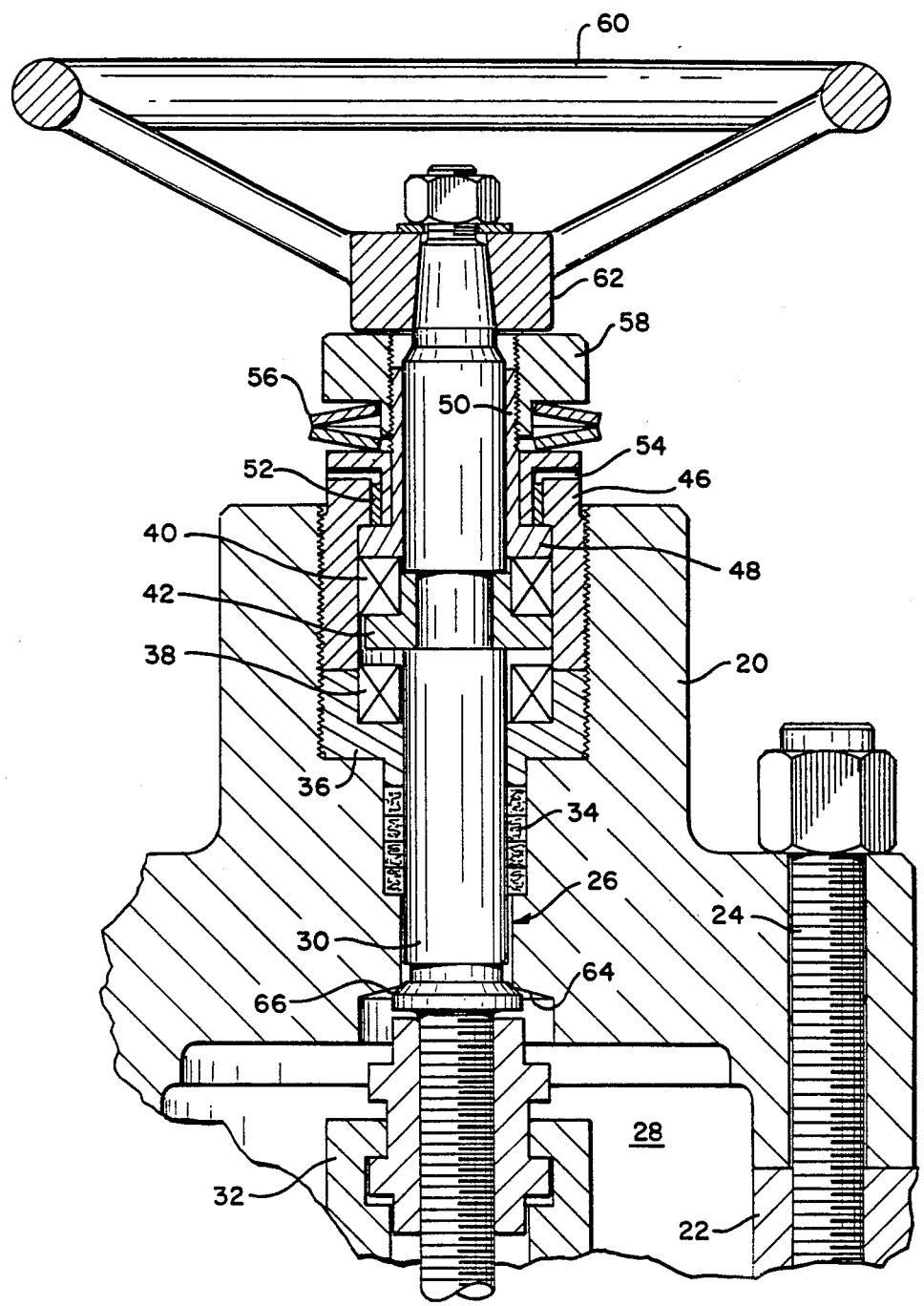
FIG. 2 shows the valve subsequent to exposure to high temperatures with the backseat seal engaged.

FIG. 2 shows the valve of FIG. 1 subsequent to the melting and venting of the fusible ring 52 and subsequent to the engagement of the sealing surfaces 64, 66. Surfaces 64, 66 may optionally be coated with a soft metal, such as silver, to assist in the formation of an effective seal at a lower contact pressure.

The valve according to the present invention thus positively forms a backseat seal against leakage from the valve chamber 28 to the exterior via the central passage 26 under conditions of abnormally high temperature. This feature is most useful not only in meeting requirements that such a backseat seal be formed under zero chamber gauge pressure, but also under those conditions in which an insufficient pressure is present within the valve chamber 28 for raising the stem 30 and engaging the seal.

Additionally, prior art valves under conditions of zero chamber gauge pressure may be heated to temperatures sufficient to ruin the packing 34 and melt the fusible ring 52 but not require the venting of the fusible ring 52 from the central passage 26. Upon cooling of such a prior art valve, the fusible ring 52 will resolidify thus preventing engagement of the backseat seal and permitting leakage of material past the ruined packing 34. The slightest possibility of such an occurrence is avoided entirely by the valve according to the present invention which positively seals under similar circumstances.

Still another feature evident in the valve as shown in FIG. 1 is the ease with which the inner bonnet mechanism may be serviced. After removing the handwheel 60 from the valve stem 30, it is possible to remove the retainer 46, the tubular spacer 50, the backseat drive spring 56, and the compression nut 58 as a complete assembly simply by unscrewing the retainer 46 from the bonnet 20. This is a decided improvement over prior art valves which require removal and reassembly of the individual members, such as the fusible ring and spacer.

Moreover, the valve according to the present invention accomplishes the objective of backseat sealing under low or no pressure conditions within the valve chamber 28 without normally exerting any force upon the valve stem 30 or bearings 38, 40. By avoiding this undesirable stem thrust under normal operating conditions, the valve is rendered more responsive and less prone to bearing failure.

Both these and other advantages will be apparent to one skilled in the art upon examination of the foregoing specification and the appended claims and drawing figures.

I claim:

1. In a normally non-rising stem valve having a valve stem which passes out of a chamber in a valve housing through a bonnet having a passageway in which a packing normally seals between the valve stem and the valve bonnet and in which a bearing assembly journals the valve stem relative to the bonnet and a retainer normally secures the bearing assembly relative to the bonnet against substantial rising axial motion of the valve stem by physically interposing a ring of fusible material between the retainer and the bearing assembly, a channel through which the fusible material may pass after melting when subjected to an abnormally high temperature for allowing the valve stem to rise a limited extent, an annular first metal sealing surface circumferentially provided on said valve stem and a second metal sealing surface provided on said bonnet within said chamber, the two sealing surfaces normally remaining spaced axially apart but which become annularly engaged in a sealed condition upon the rising of the valve stem by said limited extent; the improvement comprising:
- a tubular spacer surrounding the valve stem having a radially outward projecting flange, said flange physically axially interposed between the fusible ring and the bearing assembly, said spacer further having a tubular section extending axially outward from said flange to a point external to the retainer;
- an annular spring disposed about the tubular spacer external to the retainer; and
- a compression nut, cooperating with the tubular spacer, for axially compressing the annular spring against the retainer, said compression nut exerting an outward axial force upon the tubular spacer for compressing the fusible ring between the spacer flange and the retainer.

2. The valve of claim 1, wherein the improvement further comprises a radially projecting drive flange secured to the valve stem axially proximate the compression nut, for driving the valve stem in the rising direction for said limited extent upon the melting of the fusible ring.

3. A fire resistant, normally non-rising stem valve, comprising:
- a valve body having a chamber and a flow passage through the body and in communication with the chamber;
- a movable gate member within the chamber for regulating the flow of material through the flow passage;
- a bonnet, secured to the valve body, having a central passage therethrough, said central passage opening into the chamber at one end;
- an inward facing annular metal sealing surface disposed about the end of said passage opening into the chamber;
- a valve stem, engaging the gate member at one end and extending through said central passage, for moving the gate member within the chamber, the valve stem further including an outward facing annular sealing shoulder normally held axially spaced apart from the inward facing sealing surface;
- valve packing, disposed in the central passage between the valve stem and the bonnet, for normally sealing against leakage from the chamber through said central passage;
- a bearing, located in said central passage around the valve stem for allowing rotation of the valve stem;
- a collar, extending radially outward of the valve stem at a point axially inward from the bearing for preventing outward axial movement of the valve stem past the bearing;
- a retainer, projecting radially inward into said central passage, said retainer being secured to the bonnet;
- a fusible annular ring, located between said retainer and the bearing for maintaining the sealing surface and the sealing shoulder in the normally axially spaced apart relationship, the annular ring being made of a fusible material melting at a selected temperature, said temperature being above the normal valve operating temperature;
- a drive flange, disposed about the valve stem at a point axially outward of the retainer;
- an annular drive spring, disposed about the valve stem and compressed between the drive flange and the retainer, for providing an outward longitudinal force on the valve stem, at least when the fusible ring is melted;
- a tubular spacer, disposed within said central passage around the valve stem and having a radially outwardly projecting flange about one end, said flange being physically located between the bearing and the fusible ring, the tubular spacer extending axially outward from the flange end; and
- a compression nut, cooperating with the outward end of the tubular spacer, for axially compressing the annular spring, the retainer, and the fusible ring between the compression nut and the flange end of the tubular spacer.

4. The valve as recited in claim 3, wherein the retainer has a vent disposed therein for permitting the flow of fusible material out of said central passage upon melting of the fusible ring at said selected temperature.

* * * * *